United States Patent
Hysom et al.

(10) Patent No.: US 7,483,895 B2
(45) Date of Patent: Jan. 27, 2009

(54) METADATA MANAGEMENT

(75) Inventors: Scott S. Hysom, Bellevue, WA (US); Vasantha Badari Kostojohn, Seattle, WA (US); Aidan N. Low, Bellevue, WA (US); David G. De Vorchik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/428,173

(22) Filed: Jun. 30, 2006

(65) Prior Publication Data

US 2008/0005139 A1 Jan. 3, 2008

(51) Int. Cl.
*G06F 17/30* (2006.01)

(52) U.S. Cl. .................. 707/6; 707/9; 707/205

(58) Field of Classification Search ............. 707/6, 707/9, 100, 102, 200, 205; 713/176; 382/100
See application file for complete search history.

(56) References Cited

U.S. PATENT DOCUMENTS

| | | | |
|---|---|---|---|
| 6,871,231 B2 | 3/2005 | Morris | |
| 6,826,585 B2 | 11/2005 | Chatterjee et al. | |
| 2002/0168082 A1* | 11/2002 | Razdan | ............ 382/100 |
| 2003/0046578 A1 | 3/2003 | Brown et al. | |
| 2003/0144858 A1 | 7/2003 | Jain et al. | |
| 2003/0217121 A1 | 11/2003 | Willis | |
| 2005/0015389 A1 | 1/2005 | Novak et al. | |
| 2005/0015596 A1 | 1/2005 | Bowers | |
| 2005/0172786 A1 | 8/2005 | Plastina et al. | |
| 2006/0069733 A1 | 3/2006 | Antonoff et al. | |
| 2006/0075041 A1 | 4/2006 | Antonoff et al. | |
| 2006/0239503 A1* | 10/2006 | Petrovic et al. | ............ 382/100 |

OTHER PUBLICATIONS

White Paper WIPRO, Digital watermarking: a technology overview, Nov. 2002, Internet (http://www.securitytechnet.com/resource/application), pp. 1-9.*
Martin Steinebach et al., The digital watermarking container: secure adn efficient embedding, Internet (http://www.acm.org/10.1145), pp. 1-7.*
Cinalli et al., Metadata embedding in compressed UAV video, May 2003, American Society of Naval Engineers, Intelligent Ship Symposium, Philadelphia, PA., pp. 1-5.*
Roberto Caldelli, Frano Bartolini, Vito Cappellini; Metadata hiding tightly binding information to content; University of Florence, Florence, Italy; 2002 http://www.bncf.net/dc2002/program/ft/poster3.pdf.
Wordman,s Production Corner; Spring 2004 http://www.apmp.org/docs/spring_04_4_9.pdf.
Metadata Software to Remove Hidden Text and Data http://www.workshare.com/go/metadata-software.aspx, Apr. 11, 2006.
Todd Cheesmen; Digital Discovery & e-Evidence Digital Discovery & e-Evidence; Published by Pike & Fischer, Inc. vol. 1, No. 6; Jun. 2001 http://www.lexisnexis.com/applieddiscovery/newsEvents/PDFs/CostAllocation.pdf.
Metadata Software to Remove Hidden Text and Data http://www.workshare.com/go/metadata-software.aspx.

* cited by examiner

*Primary Examiner*—Diane Mizrahi (57) ABSTRACT

A method for removing some or all metadata from files during copying or moving. Metadata management software may register with an operating system and be called to remove metadata crossing a trust boundary, such as going from a local hard drive to a file share.

17 Claims, 7 Drawing Sheets

METADATA MANAGEMENT

TECHNICAL FIELD

This description relates generally to application programs and more specifically to file management.

BACKGROUND

As computer usage increases, so does the amount of data that users may seek to share between computers. Not only has the number of files being shared or accessed increased, but also the size of the files being transferred.

For example, users may transfer documents, spreadsheets, pictures and other types of files or documents. As the document size and complexity has grown, ways of summarizing a document or file content have been developed. For example it may be desirable to examine a summary of the content of a file or other ancillary information about the file or document before opening or downloading or otherwise processing it. One way to provide this information is through metadata.

Data files on computers often have descriptions or metadata which can tell extra information about the file. Examples of metadata include the file name, creation time, and size. Other metadata may include the author's name, e-mail lists of reviewers, keywords to help organize files, and so on. Some of this information may be personal or of a confidential nature that a user may not wish to distribute.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example may provide a way for a user to use services provided to an operating system in conjunction with application software to easily remove or strip metadata when moving or copying files. The removal of metadata method may be invoked by a variety of application programs and applied to a variety of file types and types of metadata.

Many of the attendant features may be more readily appreciated as the same becomes better understood by reference to the following detailed description considered in connection with the accompanying drawings.

DESCRIPTION OF THE DRAWINGS

The present description may be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a method for stripping metadata. Although the present examples are described and illustrated herein as being implemented in a PC, the system described is provided as an example and not a limitation. As those skilled in the art may appreciate, the present examples are suitable for application in a variety of different types of processing environments.

When sharing a file with other people it may be inappropriate or undesirable to share all of the metadata with them. The removal or stripping of metadata is often not considered by the average person placing a file on a share, since much of the information is often not obvious unless you are in an application designed for looking at that type of data for that kind of file. As a result, a user may inadvertently share data that is not important, or worse, in some cases, may share personally identifiable data which he or she did not intend other people to see.

Figure 1:
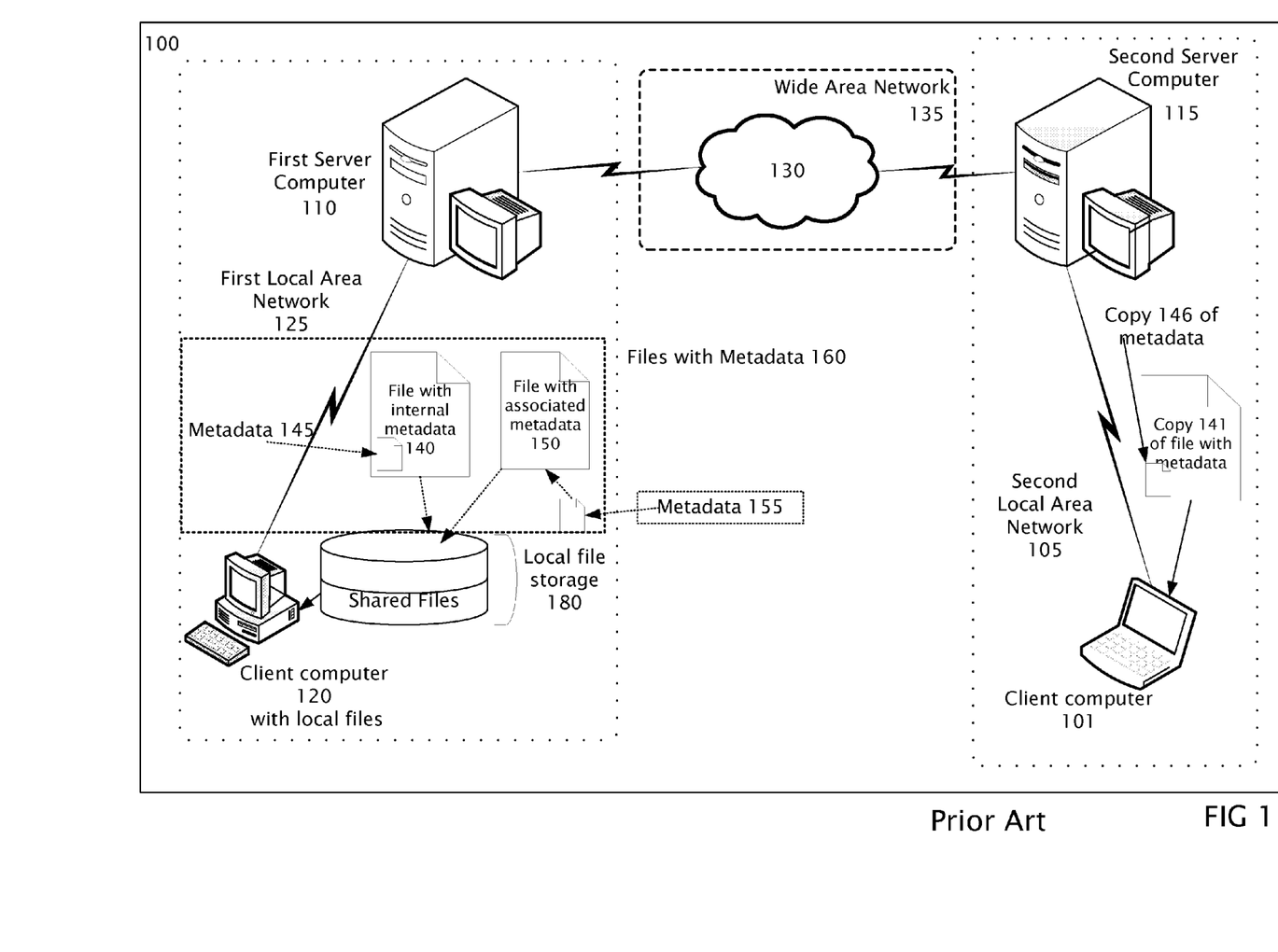
FIG. 1 is an exemplary conventional network including a client computer with local files that may have metadata.

FIG. 1 is an exemplary conventional network 100 including a client computer 120 with local files with metadata 160. Client computer 120 may be coupled to a conventional first server computer 110 through a conventionally constructed first local area network 125.

First server computer 110 may be coupled to wide area network 135, which is conventionally constructed and may include the Internet 130 or equivalent coupling methods for providing wide area networking. As shown wide area network 135 is coupled to conventionally constructed second server computer 115. In this example, second server computer 115 is coupled to conventionally constructed computer 101 over a conventionally constructed second local area network 105.

Local area networks 125 and 105 may include a plurality of conventional computers (not shown) and conventional peripheral equipment (not shown) coupled together utilizing topologies (token ring, star and the like) and switching equipment known to those skilled in the art. Those skilled in the art may realize that other processor equipped devices such as televisions and VCRs with electronic program guides, cellular telephones, appliances and the like may be coupled to the networks utilizing conventional techniques known to those skilled in the art.

A typical local area network 105 or 125 may include a conventionally constructed ISP network in which a number or plurality of subscribers utilize telephone dial up, ISDN, DSL, cellular telephone, cable modem, or the like connections to couple their computer to one or more server computers 110 or 115 that provide a connection to the wide area network 135 via the Internet 130.

Client computers 101 or 120 may have files with metadata, and may have all or part of their respective hard disks shared out and available to other users. Those skilled in the art may realize that the computers 101, 120 may be any number of devices, including a PC, cell phone, Internet appliance, set top box, hand-held computers, and the like.

Client computer 120 may have local file storage 180, which may be a hard disk, optical disk drive and media, flash memory, or any equivalent mass storage device or a combination of a plurality of such devices. Portions of local file storage 180 may be shared by the owner or user to be available to other people on network 100 or any other devices coupled in any way to client computer 120, such as other local area networks, peer-to-peer networks, infrared coupled devices, or other equivalents. Client computer 120 may have files 140 with metadata 145 stored on local file storage 180 that have metadata 145 embedded, or may have files 150 stored on local file storage 180 that have separately disposed metadata 155. Such files may also be stored on first server computer 110, or on any of a plurality of computer readable media available to client computer 120.

Client computer 120 may have files 140, 150 with metadata 145, 155 that the owner or user would not want shared with other users. For example, if the user of client computer 120 has a local file 140 with metadata 145, or local file 150 with metadata 150 that the user is going to make available on the Internet 130, the user may have to manually enter an application and manually remove each item of metadata that the user doesn't want to share, such as author names or e-mail addresses, or any other metadata associated with the file. In many cases, the user may not think about removing the metadata, resulting in having data shared without the user's consent such as with a file 141 that has been copied to a client computer 101 in a second area network 105.

Figure 2:
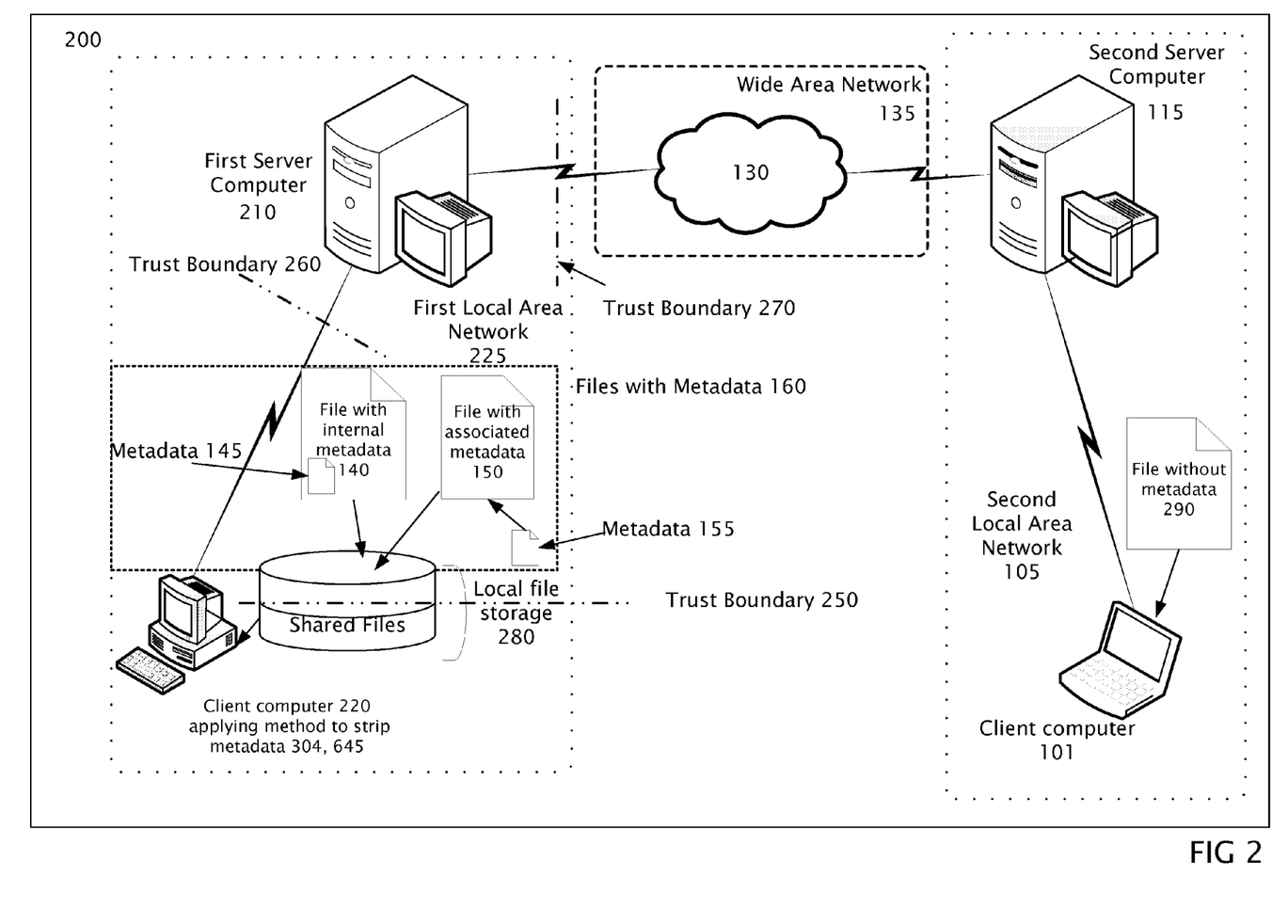
FIG. 2 is an exemplary network 200 including a client computer 220 with local files that may have metadata 160 and running a method to strip metadata before transferring the files 304, 645.

FIG. 2 is an exemplary network 200 including a client computer 220 with local files with metadata 160 and running an application having a method to strip metadata from files 204. Client computer 220 with an application having a method to strip metadata 204 may be coupled to a conventional first server computer 210 through a conventionally constructed first local area network 225.

First server computer 210 may be coupled to wide area network 135, which is conventionally constructed and may include the Internet 130 or equivalent coupling methods for providing wide area networking. As shown wide area network 135 is coupled to conventionally constructed second server computer 115. In this example, second server computer 115 is coupled to conventionally constructed computer 101 over a conventionally constructed second local area network 105.

Local area networks 225 and 105 may include a plurality of conventional computers (not shown) and conventional peripheral equipment (not shown) coupled together utilizing topologies (token ring, star and the like) and switching equipment known to those skilled in the art. Those skilled in the art may realize that other processor equipped devices such as televisions and VCRs with electronic program guides, cellular telephones, appliances and the like may be coupled to the networks utilizing conventional techniques known to those skilled in the art.

A typical local area network 105 or 225 may include a conventionally constructed ISP network in which a number or plurality of subscribers utilize telephone dial up, ISDN, DSL, cellular telephone, cable modem, or the like connections to couple their computer to one or more server computers 110 or 115 that provide a connection to the wide area network 135 via the Internet 130.

Client computers 101 or 220 may have files with metadata, and may have all or part of their respective hard disks shared out and available to other users. Those skilled in the art may realize that the computers 101, 220 may be any number of devices, including a PC, cell phone, Internet appliance, set top box, hand-held computers, and the like.

Trust boundaries 250, 260, 270 represent boundaries where a user or owner may want to limit which metadata is transferred. For example, a user of client computer 220 may make a file 140 with metadata 142 available on the shared portion of local file storage 280. If that share is available to the user of client computer 101, the user on client computer 220 may want to remove metadata such as the authors e-mail address. A method to strip metadata could be invoked when crossing such boundaries to remove any such metadata. The trust boundary 270 represents the coupling between first server computer 210 and wide area network 135. Trust boundary 260 may be on the coupling between client computer 210 and the first server computer 210, which trust boundary 250 could be between the unshared and the shared portion of local file storage 280. These trust boundaries are exemplary in nature, and other trust boundaries could be defined or implemented, and these may or may not cause the method to strip metadata invoked.

Configuring these trust boundaries may be done by the owner of the files, the user of the computer, system administrators, group policy on the local area network 225, or any other method. Which metadata is removed may also be configured; in some cases a company may want certain metadata to be associated with the file for all users, which other metadata may only be viewable by members of a certain security group, for example. A person skilled in the art may recognize that there are many potential ways to configure a metadata stripper, both in when it is invoked, and which information it removes.

If the file 140 is subsequently copied to client computer 101 and the method to strip metadata is invoked, file without metadata 290 may be disposed on client computer 101 which may have the same information as file 140 which has been retained, but with the metadata completely or partially removed.

Figure 3:
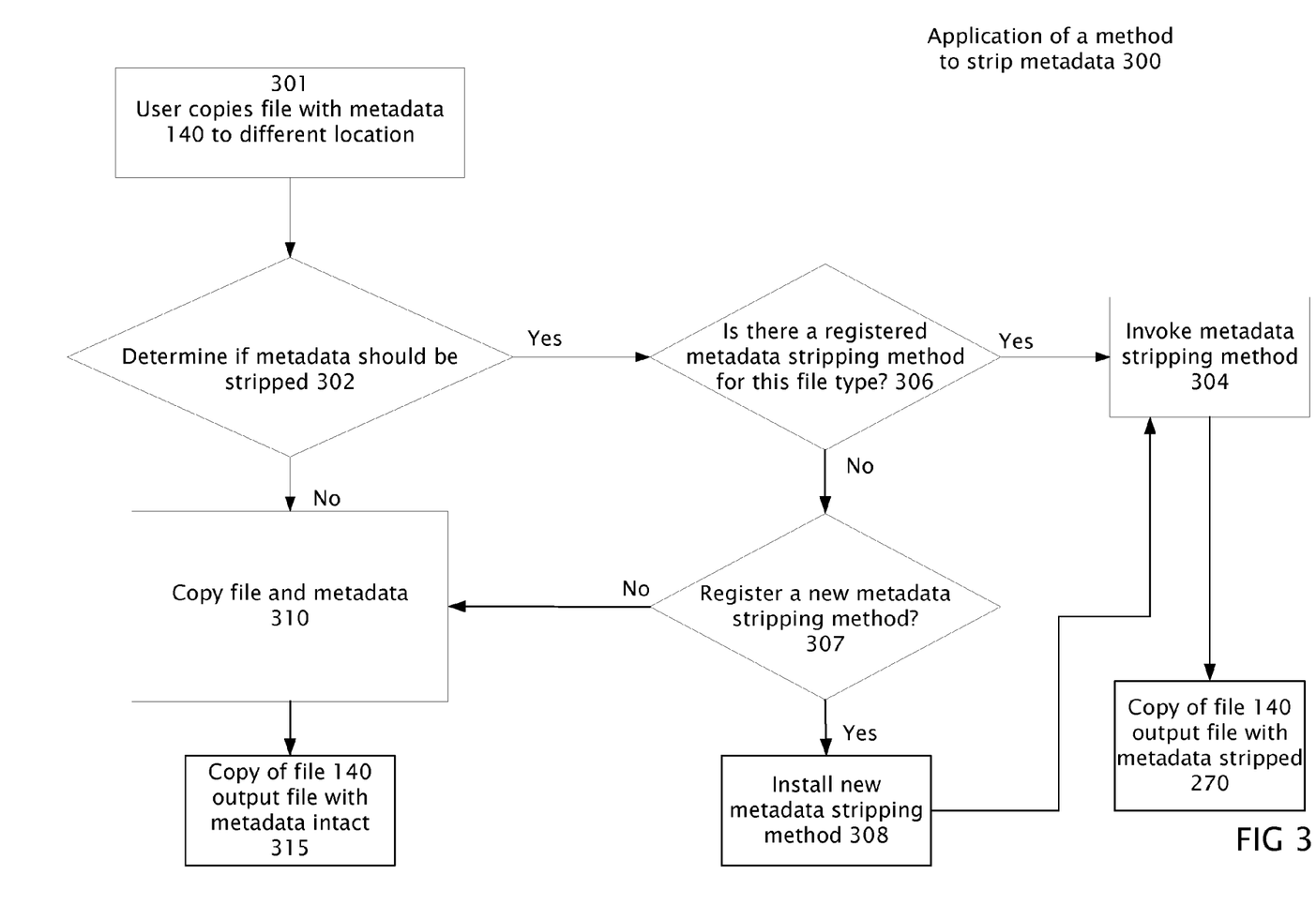
FIG. 3 shows a flow diagram showing a method of applying a method of metadata stripping to determine if metadata should be stripped from a file when it is copied or moved.

FIG. 3 shows a flow diagram showing a method of applying a method of metadata stripping to determine if metadata should be stripped from a file when it is copied or moved 300. At block 301, a user copies a file with metadata to a different location. Decision 302 determines if metadata should be stripped. If it should, a determination 306 may be made as to whether there is a metadata stripper for this type of file registered. If so, the metadata stripping method 204 may be invoked, and a copy 270 of file with the metadata removed may be output. If not, the user may be asked if he or she wants to register a new metadata stripping method for this file 307. If the user chooses to do so, a new metadata stripper may be registered 308 and the metadata stripping method 304 may be invoked. If the user does not choose to install a new metafile stripper, the file and metadata may be copied 310 in a conventional manner.

If the metadata should not be stripped, the file may be copied 310 in a conventional manner, with metadata intact 315. The determination of whether the metadata should be stripped 302 may be made automatically, for example, by having a configuration file or a group policy determining when metadata may be stripped. It may also be made manually, for example by the user deciding that the metadata may or may not be stripped in this case. Decision 302 may also be made through any combination of these or other criteria.

Figure 4:
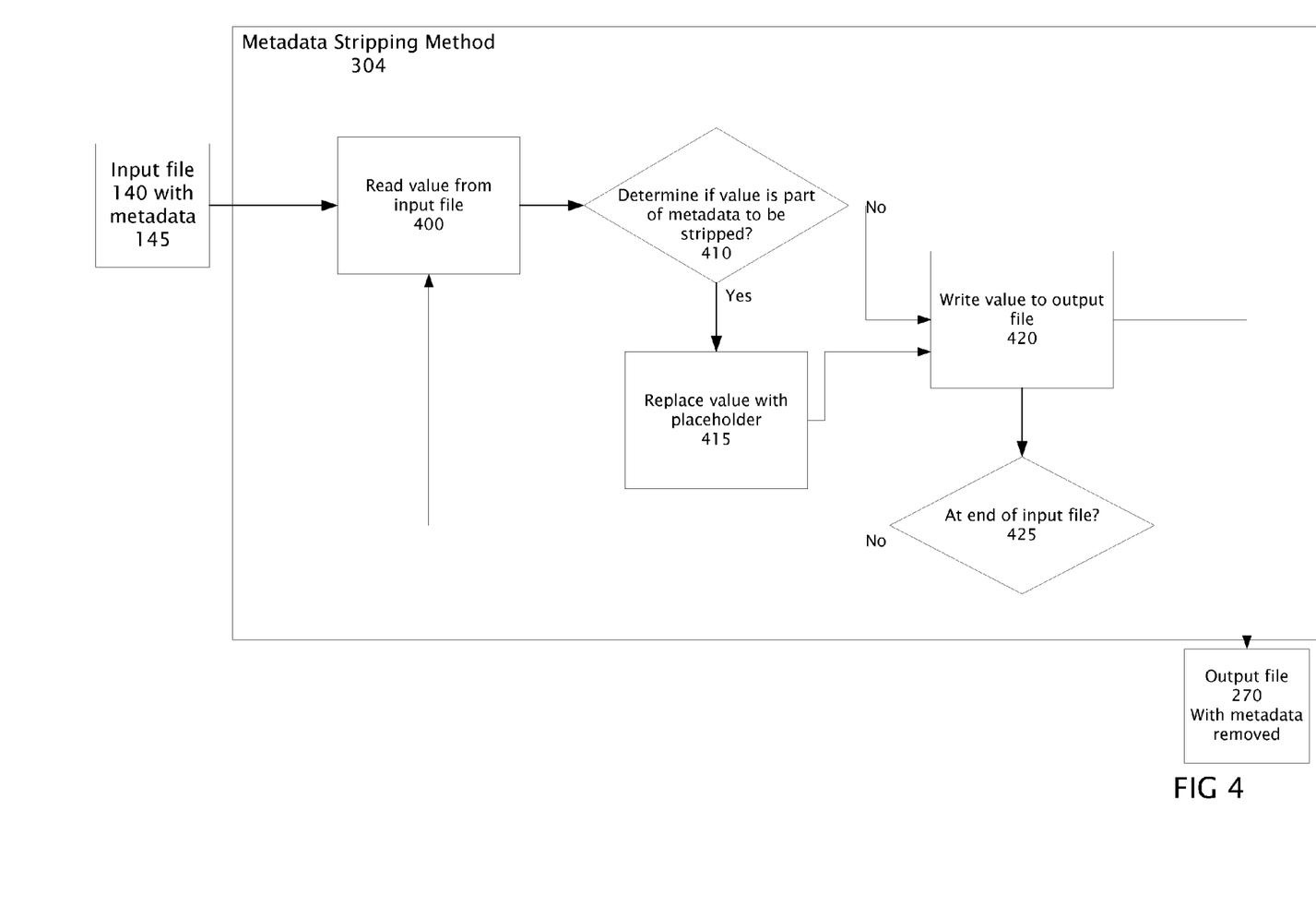
FIG. 4 shows a flow diagram of a metadata stripping method.

FIG. 4 shows a flow diagram of a metadata stripping method 304. With a file with metadata input to metadata stripping method 304, the output file 270 may have some or all of the metadata removed. At block 400, a value may be read from the input file. Block 410 checks if the value read is part of metadata that is to be stripped. If it is, the value may be replaced by a placeholder 415. The value may then be written to an output file 270 with metadata removed. A test may then be made 425 to determine if the end of the input file has been reached. If not, the process may loop back to step 400 by reading the next value from the input file with metadata. One skilled in the art may realize that metadata may be comprised of different data types, such as strings, numbers, bit-values, and the like, and that the placeholder used may differ based on the data type of the value of the metadata.

For example, if the metadata value is a string of a particular length, the placeholder may consist of a string of the same length made up of the space character. Alternatively, the placeholder may not need to be the same length, or may be made up of characters other than the space character. If the metadata value is a number, the placeholder may be a zero, or some other number. In other embodiments, the metadata may be replaced with valid but different metadata. For example, a company may replace an author's name within the company with the company name when a file is made available outside the company.

In an alternate embodiment, the metadata may be stripped in-place by overwriting the values containing the metadata in file with other valid values for the metadata information.

Figure 5:
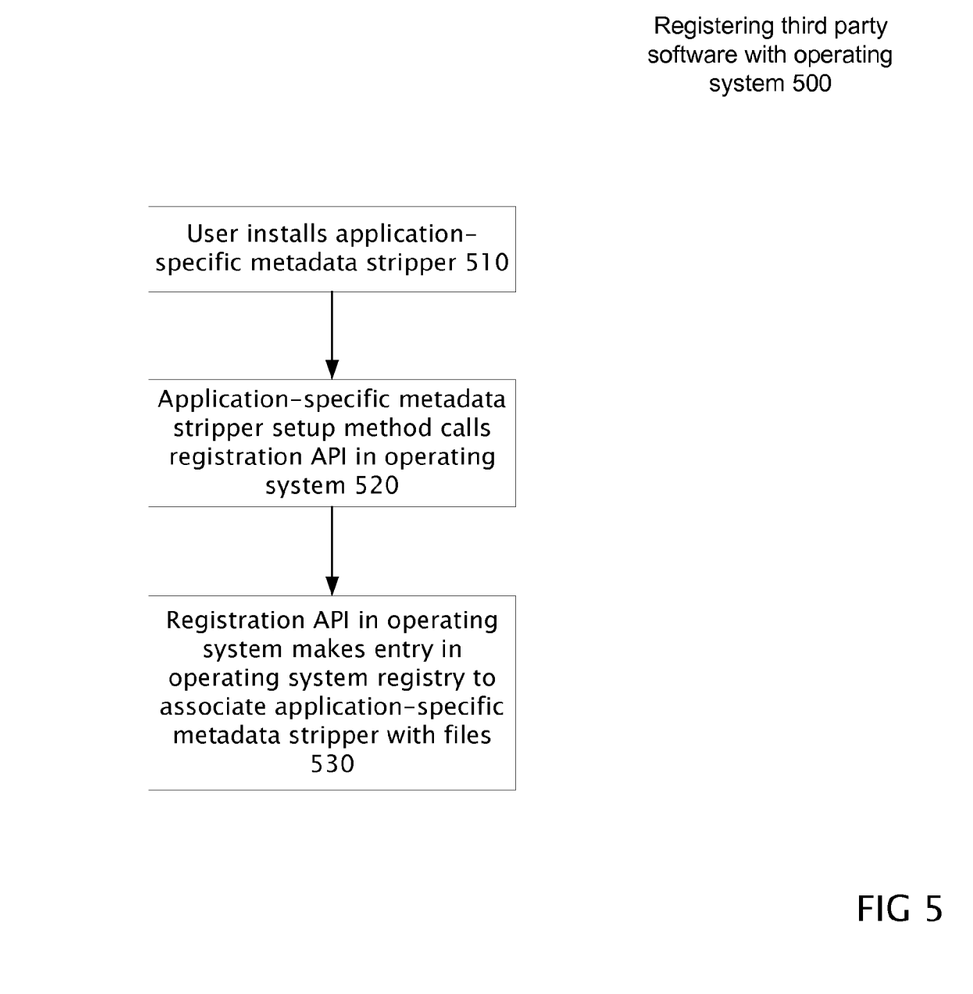
FIG. 5 is a flow chart showing a third party metadata stripper registering with an operating system.

FIG. 5 is a flow chart showing a metadata stripper registering with an operating system 500. A user may install an application-specific metadata stripper 510 on a computer. During the installation 520, the setup process may call an API in the operating system to register the application-specific metadata stripper and associate it 530 with the plurality of file types it may process for managing metadata. Registration may result in an entry written into the operating system registry file, a configuration file, or in any other computer readable media or equivalent.

Figure 6:
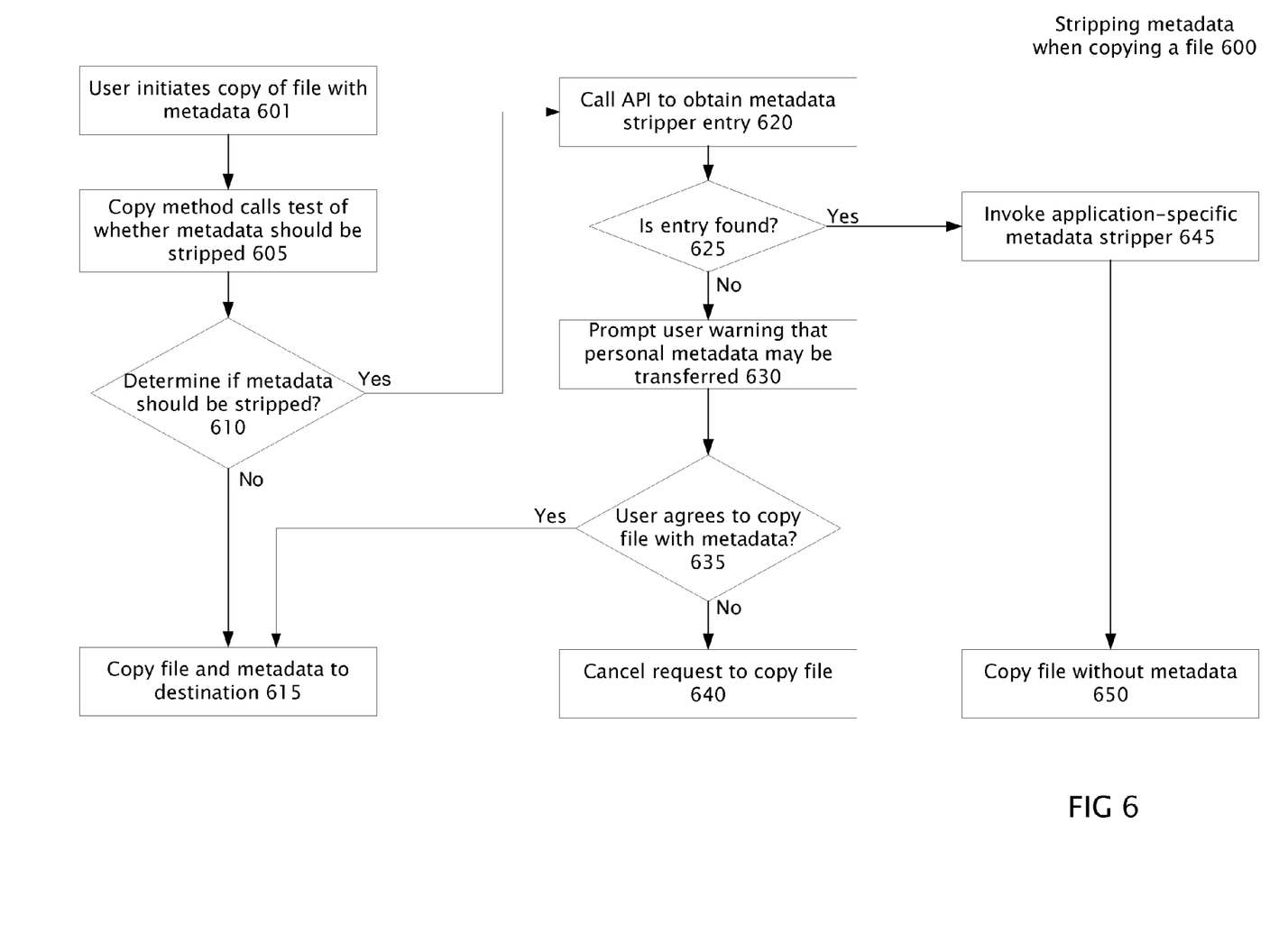
FIG. 6 is a block flow chart of an alternate example showing a method of applying a method of metadata stripper to determine if metadata should be stripped from a file when it is copied.

FIG. 6 is a block flow chart of an alternate example showing a method of applying a method of metadata stripper to determine if metadata should be stripped from a file when it is copied 600. A user may initiate a file copy method 601. The copy method may call 605 for a test of whether metadata should be stripped during the copy. For example, the test 610 may compare the source and the destination of the file copy to determine if a trust boundary may be crossed. For example, if the source is on a private portion of a local hard disk a trust boundary may be crossed if the destination is a shared portion of the same drive, or if the destination is a server on a local area network. Such trust boundaries may be defined by the user, an administrator of a computer, or by group policies on a network. Trust boundaries could also be associated on a file-by-file or a folder-by-folder basis. One skilled in the art may realize that other trust boundaries could established, other methods could be used to define them, and other associations may be used to manage trust boundaries. The determination of whether the copied file should have metadata stripped 610 may be made automatically, for example, by having a configuration file or a group policy determining when metadata may be removed. It may also be made manually, for example by the user deciding that the metadata may or may not be stripped in this case. Decision 610 may also be made through any combination of these or other criteria.

If test 610 determines that metadata does not need to be stripped, a conventional copy file method 615 may be used to copy the file and metadata to the destination. If test 610 determines that metadata may be stripped, an API may be called 620 to determine the appropriate metadata stripper to use for the source file. If an entry is found 625, the application-specific metadata stripper may be invoked 645. The file may then be copied with some or all of the metadata removed 650. If the API call 620 does not find an entry for that type of file 625, a prompt may be displayed to the user warning that metadata may be transferred 630. The user may agree to copy the file with the metadata 635, in which case the file may be copied with the metadata using a conventional file copy method 615. If the user does not agree 635, the request to copy the file may be canceled 640. Other implementations may automatically decide what to do in the event that a metadata stripper is not found 625, such as automatically canceling the copy, or automatically doing a conventional copy.

Figure 7:
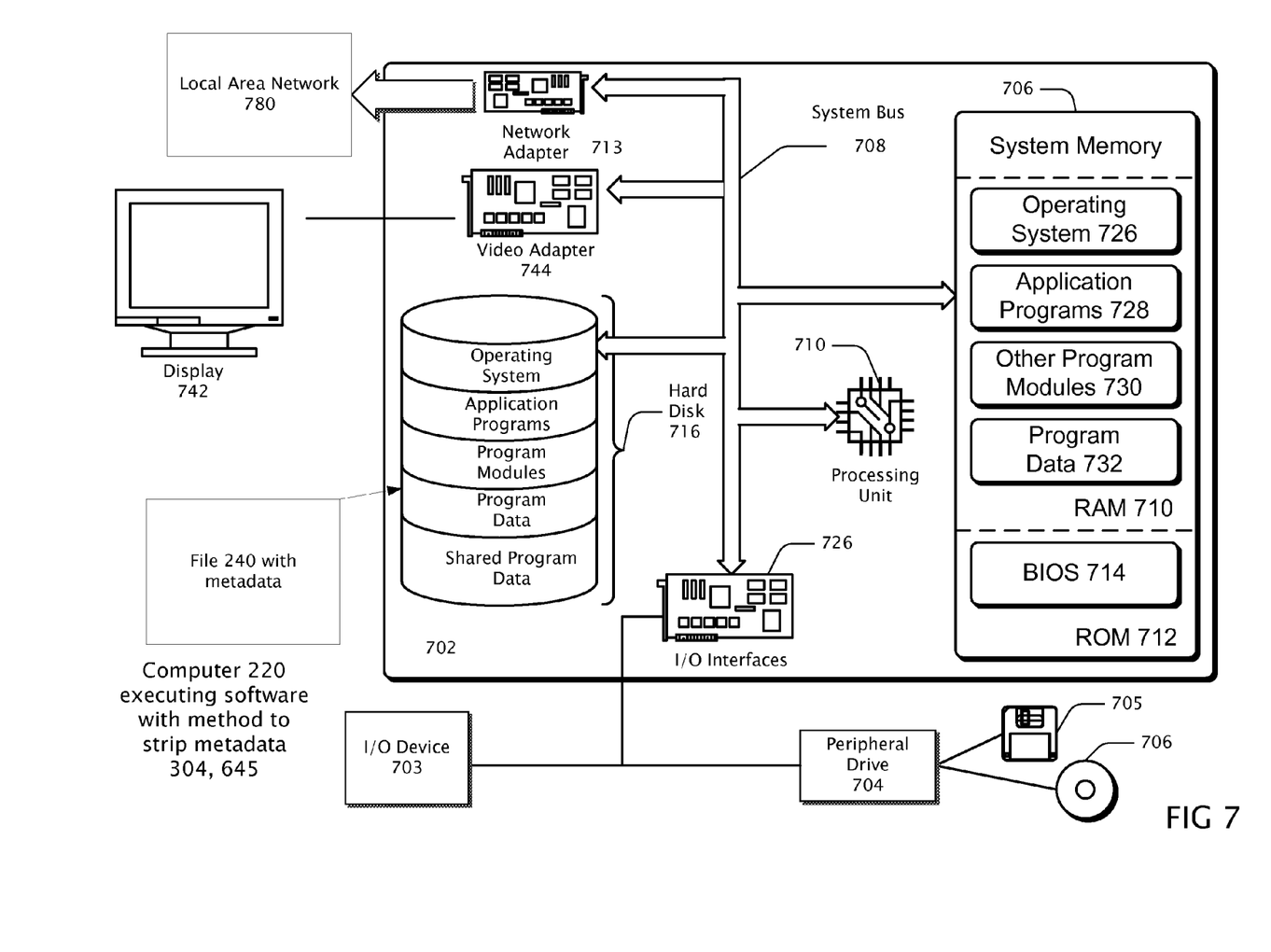
FIG. 7 is a block diagram of an exemplary computer in which a method to strip metadata from files may be executed.

FIG. 7 is a block diagram of an exemplary computer 220 in which software executing a method to strip metadata 304, 645 may be executed. Exemplary computing environment 220 is only one example of a computing system and is not intended to limit the examples described in this application to this particular computing environment.

A peripheral drive 704 may accept a computer readable media 705, 706 that includes a copy of the method to strip metadata. The peripheral drive may be coupled to an I/O interface 726 along with an I/O device 703.

The I/O interface 726 may be coupled to a bus structure 708, which also may couple to a hard disk 716, a processor 710, system memory 706, a video adapter 744 and a network adapter 713.

Video adapter 744 typically couples a display 742 to the CPU 710. Network adapter 713 typically couples a local area network 780 to the CPU 710.

For example the computer 220 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 220 includes a general-purpose computing system in the form of a CPU 710, display 742, I/O device 703, and peripheral drive 704. The CPU 710 can include one or more processors (including CPUs, GPUs, microprocessors and the like) 710, a conventional system memory 706, and a conventional system bus 708 that couples the various system components. Processor 710 processes various computer executable instructions, including those to control the operation of computing device 220 and allows communication with other electronic and computing devices (not shown). The system bus 708 represents any number of several types of bus structures, including a memory bus or memory controller, a peripheral bus, an accelerated graphics port, and a processor or local bus using any of a variety of bus architectures.

The system memory 706 may include computer-readable media in the form of volatile memory, such as random access memory (RAM) 710, and/or non-volatile memory, such as read only memory (ROM) 712. A basic input/output system (BIOS) 714 is typically stored in ROM. RAM typically contains data and/or program modules 726, 728, 730, 732 that are immediately accessible to and/or presently operated on by one or more of the processors 710. Computing device 220 may include other removable/non removable, volatile/non-volatile computer storage media.

A hard disk drive 716 is also a type of computer readable media that may read from and write to a non-removable, non-volatile magnetic media (not shown). Such a hard disk 716 may include a magnetic disk drive which reads from and writes to a removable, non volatile magnetic disk (e.g., a "floppy disk") 705, or an optical disk drive that reads from and/or writes to a removable, non-volatile optical disk such as a CD ROM or the like. In this example, the hard disk drive 710, and disk drive 704 are each connected to the system bus 708 by one or more data media interfaces 726. The disk drives and associated computer readable media provide non volatile storage of computer readable instructions, data structures, program modules, and other data for computing device 220.

Mass storage devices (or peripheral drive) 704 are also a type of computer readable media that may be coupled to the computing device or incorporated into the computing device by coupling to the bus 708. Such peripheral drive 704 may include a magnetic disk drive which reads from and writes to a removable, non volatile magnetic disk (e.g., a "floppy disk") 705, or an optical disk drive that reads from and/or writes to a removable, non-volatile optical disk such as a CD ROM or the like 706. This mass storage device may be representative of those storing a file with metadata 240. In the example described above the method to strip metadata 204 may be disposed on the hard disk 716 or the system memory 706. Computer readable media ("CRM") 705, 706 typically embody computer readable instructions, data structures, program modules and the like supplied on floppy disks, CDs, portable memory sticks and the like. A method to strip metadata may also be disposed on such CRM.

Any number of program modules or processes can be stored on the hard disk 716, or peripheral drive 704, including by way of example, files containing metadata 204, an operating system, one or more application programs, other program modules, and program data. Each of such operating system, application programs, other program modules and program data (or some combination thereof) may include an embodiment of the systems and methods described herein.

A display device 742 can be connected to the system bus 708 via an interface, such as a video adapter 744. A user can interface with the CPU 710 via any number of different input devices 703 such as a keyboard, pointing device, joystick, game pad, serial port, and/or the like. These and other input devices are connected to the processors 710 via input/output interfaces 703 that are coupled to the system bus 708, but may be connected by other interface and bus structures, such as a parallel port, game port, and/or a universal serial bus (USB).

Computer 220 can operate in a networked environment using connections to one or more remote computers through one or more local area networks (LANs), wide area networks (WANs) and the like. The computer 220 is connected to a network 700 via a network adapter 713 or alternatively by a modem, DSL, ISDN interface or the like.

The invention claimed is:

1. A method of removing metadata comprising:
   receiving a first indication to copy a first file associated with a first metadata across a first trust boundary;
   based on the first indication, determining that the first file is being transferred across the first trust boundary;
   determining availability of a first metadata stripper for a first file type corresponding to the first file;
   determining at least a portion of the first metadata for removal;
   removing the at least a portion of the first metadata with the first metadata stripper, wherein the removing comprises reading a value from the first file, determining the value is the at least a portion of the first metadata, and writing a placeholder value to a third file, the placeholder value being different than the value from the first file;
   transferring the third file across the first trust boundary;
   copying the first file with the at least a portion of the first metadata removed across the first trust boundary;
   receiving a second indication to copy a second file associated with a second metadata across a second trust boundary;
   based on the second indication, determining that the second file is being transferred across a second trust boundary;
   determining availability of a second metadata stripper for a second file type corresponding to the second file;
   determining at least a portion of the second metadata for removal;
   removing the at least a portion of the second metadata with the second metadata stripper; and
   copying the second file with the at least a portion of the second metadata removed across the second trust boundary.

2. The method of claim 1 further comprising identifying the first trust boundary by receiving an input from an owner of the first file.

3. The method of claim 1 further comprising identifying the first trust boundary based on a group policy on a local area network.

4. The method of claim 1 wherein the first metadata is internal to the first file.

5. The method of claim 1 wherein the first metadata is external to the first file.

6. The method of claim 1 wherein the first file type is different than the second file type.

7. The method of claim 1 wherein the first trust boundary is a coupling between a computer and a local area network.

8. The method of claim 1 wherein the first trust boundary is a boundary between a private and a shared portion of a local file storage.

9. The method of claim 1 wherein determining the value is the at least a portion of the first metadata further comprises:
   presenting an option to a user; and
   receiving an indicator from the user.

10. The method of claim 1 wherein the determining the value is the at least a portion of the first metadata is based on a configuration of the metadata stripper.

11. A system for removing metadata comprising:
   a memory configured to store a plurality of modules, each module including a plurality of instructions;
   a processor coupled to the memory for executing the plurality of instructions of the plurality of modules, the modules comprising:
   a copying module for reading a first file in a first location and writing a second file to a second location;
   a trust boundary determining module for determining if the second location is across a trust boundary from the first location;
   a stripping determining module for determining at least a portion of a metadata associated with the first file to remove, wherein the stripping determining module comprises a notification module for notifying a user that a trust boundary will be crossed, and a receiving module for receiving input from a user; and
   a metadata stripper module for preventing the at least a portion of a metadata from being written to the second file if the trust boundary determining module determines that the second location is across a trust boundary from the first location, wherein the metadata stripper module is configured to read a value from the first file, determine that the value is the at least a portion of metadata, and write a placeholder value to the second file, the placeholder value being different than the value from the first file.

12. The system of claim 11 wherein the trust boundary determining module bases the determining on a group policy on a local area network.

13. The system of claim 11 wherein the trust boundary determining module bases the determining on input from system administrators.

14. A computer-readable media comprising non-volatile storage with instructions thereon that, when executed by a processor, performs a method of removing metadata comprising:

receiving an indication to copy a first file associated with a first metadata across a first trust boundary;

based on the indication, determining that the first file is being transferred across the first trust boundary;

determining availability of a metadata stripper for a first file type corresponding to the first file;

determining at least a portion of the first metadata for removal;

removing the at least a portion of the first metadata with the first metadata stripper, wherein the removing comprises reading a value from the first file, determining that the value is the at least a portion of the first metadata, and replacing the value from the first file with a placeholder value, the placeholder value being different than the value from the first file; and copying the first file with the at least a portion of the first metadata replaced by the placeholder value, across the first trust boundary if the second location is across a trust boundary from the first location;

receiving a second indication to copy a second file associated with a second metadata across a second trust boundary;

based on the second indication, determining that the second file is being transferred across a second trust boundary;

determining availability of a second metadata stripper for a second file type corresponding to the second file;

determining at least a portion of the second metadata for removal;

removing the at least a portion of the second metadata with the second metadata stripper; and copying the second file with the at least a portion of the second metadata removed across the second trust boundary.

15. The computer-readable media of claim 14 wherein the first metadata is internal to the first file.

16. The computer-readable media of claim 14 wherein the first metadata is external to the first file.

17. The computer-readable media of claim 14 wherein the second file type is different than the first file type.

* * * * *